United States Patent
Hernandez et al.

(10) Patent No.: US 11,949,996 B2
(45) Date of Patent: Apr. 2, 2024

(54) AUTOMATIC WHITE BALANCE CORRECTION FOR DIGITAL IMAGES USING MULTI-HYPOTHESIS CLASSIFICATION

(71) Applicant: Huawei Technologies Co., Ltd., Shenzhen (CN)

(72) Inventors: Daniel Hernandez, Munich (DE); Sarah Parisot, London (GB); Ales Leonardis, London (GB); Gregory Slabaugh, Munich (DE); Steven George McDonagh, London (GB)

(73) Assignee: Huawei Technologies Co., Ltd., Shenzhen (CN)

(*) Notice: Subject to any disclaimer, the term of this patent is extended or adjusted under 35 U.S.C. 154(b) by 101 days.

(21) Appl. No.: 17/743,216

(22) Filed: May 12, 2022

(65) Prior Publication Data
US 2022/0295030 A1 Sep. 15, 2022

Related U.S. Application Data

(63) Continuation of application No. PCT/EP2019/081178, filed on Nov. 13, 2019.

(51) Int. Cl.
*H04N 23/88* (2023.01)
*G06V 10/56* (2022.01)
(Continued)

(52) U.S. Cl.
CPC ............ *H04N 23/88* (2023.01); *G06V 10/56* (2022.01); *G06V 10/60* (2022.01); *G06V 10/762* (2022.01);
(Continued)

(58) Field of Classification Search
CPC .... G06V 10/774; G06V 10/56; G06V 10/764; G06V 10/762; G06V 10/60; G06V 10/82;
(Continued)

(56) References Cited

U.S. PATENT DOCUMENTS

| | | | |
|---|---|---|---|
| 7,885,458 | B1 | 2/2011 | Lin |
| 8,189,067 | B2 * | 5/2012 | Dalton .................. H04N 23/88 |
| | | | 348/224.1 |

(Continued)

FOREIGN PATENT DOCUMENTS

| | | |
|---|---|---|
| CN | 106211804 A | 12/2016 |
| CN | 106296658 A | 1/2017 |

OTHER PUBLICATIONS

Oh et al., "Approaching the Computational Color Constancy as a Classification Problem through Deep Learning," XP080722405, arxiv.org, Cornell University Library, 201 Olin Library Cornell University Ithaca, NY 14853, total 14 pages (Aug. 29, 2016).

(Continued)

*Primary Examiner* — Pritham D Prabhakher
(74) *Attorney, Agent, or Firm* — Leydig, Voit & Mayer, Ltd.

(57) ABSTRACT

A device for estimating a scene illumination color for a source image is configured to: determine a set of candidate illuminants and for each of the candidate illuminants, determine a respective correction of the source image; for each of the candidate illuminants, apply the respective correction to the source image to form a corresponding set of corrected images; for each corrected image from the set of corrected images, implement a trained data-driven model to estimate a respective probability of achromaticity of the respective corrected image; and based on the estimated probabilities of achromaticity for the set of corrected images, obtain a final estimate of the scene illumination color for the source image. This approach allows for the evaluation of multiple (Continued)

candidate illuminates to determine an estimate of the scene illumination color.

20 Claims, 4 Drawing Sheets

(51) Int. Cl.
*G06V 10/60* (2022.01)
*G06V 10/762* (2022.01)
*G06V 10/764* (2022.01)
*G06V 10/774* (2022.01)
*G06V 10/82* (2022.01)
*H04N 9/64* (2023.01)

(52) U.S. Cl.
CPC .......... *G06V 10/764* (2022.01); *G06V 10/774* (2022.01); *G06V 10/82* (2022.01); *H04N 9/646* (2013.01)

(58) Field of Classification Search
CPC .... H04N 1/6086; H04N 1/6077; H04N 9/646; H04N 23/88
USPC ....................................................... 348/223.1
See application file for complete search history.

(56) References Cited

U.S. PATENT DOCUMENTS

| | | | |
|---|---|---|---|
| 9,336,582 B1 | 5/2016 | Barron | |
| 9,672,604 B2 | 6/2017 | Barron | |
| 9,794,540 B2* | 10/2017 | Barron | ................. H04N 1/6027 |
| 10,091,479 B2 | 10/2018 | Barron et al. | |
| 10,491,875 B2* | 11/2019 | Moriya | ................... G06T 5/008 |
| 10,713,816 B2* | 7/2020 | Hu | .......................... H04N 1/60 |
| 2007/0171421 A1* | 7/2007 | Ochi | ....................... G01J 3/465 |
| | | | 356/402 |
| 2011/0025878 A1 | 2/2011 | Dalton et al. | |
| 2016/0350900 A1* | 12/2016 | Barron | ...................... G06T 5/20 |
| 2018/0007337 A1* | 1/2018 | Barron | ...................... G06T 5/40 |
| 2018/0249141 A1* | 8/2018 | Moriya | ................... G06T 5/008 |
| 2018/0260975 A1 | 9/2018 | Sunkavalli et al. | |
| 2018/0330183 A1* | 11/2018 | Tsunoda | ................ G06F 18/217 |
| 2019/0019311 A1 | 1/2019 | Hu et al. | |
| 2020/0035194 A1* | 1/2020 | Lee | ........................... G06T 7/13 |
| 2021/0262934 A1* | 8/2021 | Watanabe | .............. G01N 21/47 |

OTHER PUBLICATIONS

Hernandez-Juarez et al., "A Multi-Hypothesis Approach to Color Constancy," IEEE, total 11 pages (2020).
Bianco et al., "Automatic color constancy algorithm selection and combination," Pattern Recognition, Contents lists available at ScienceDirect, total 11 pages (Accepted Aug. 6, 2009).
Hernandez-Juarez et al., "A Multi-Hypothesis Approach to Color Constancy," XP081611828, arxiv.org, Cornell University Library, 201 Olin Library Cornell University Ithaca, NY 14853, total 18 pages (Mar. 2, 2020).
Cheng et al., "Illuminant Estimation for Color Constancy: Why spatial domain methods work and the role of the color distribution," total 10 pages (2014).
Deng et al., "ImageNet: A Large-Scale Hierarchical Image Database," IEEE Computer Society Conference on Computer Vision and Pattern Recognition, total 9 pages (Jun. 2009).
Devries et al., "Learning Confidence for Out-of-Distribution Detection in Neural Networks," total 12 pages (Feb. 13, 2018).
Lloyd, "Least Squares Quantization in PCM," IEEE Transactions On Information Theory, vol. IT-28, No. 2, total 9 pages (Mar. 1982).
Simonyan et al., "Very Deep Convolutional Networks for Large-Scale Image Recognition," Published as a conference paper at ICLR 2015, total 14 pages (2015).
"Shi's Re-processing of Gehler's Raw Dataset," Retrieved from: https://www2.cs.sfu.ca/~colour/data/shi_gehler/, total 3 pages, Computational Vision Lab Computing Science, Simon Fraser University, Burnaby, BC, Canada, V5A 1S6 (Last Updated: Sep. 18, 2000).
"Data for Computer Vision and Computational Colour Science," Retrieved from: https://www2.cs.sfu.ca/~colour/data/, Computational Vision Lab Computing Science, Simon Fraser University, Burnaby, BC, Canada, V5A 1S6, total 3 pages (Last Updated: May 7, 2014).

* cited by examiner

Figure 2

| Layer | Kernel | Input | Output |
|---|---|---|---|
| Conv. | $3 \times 3$ | $64 \times 64 \times 3$ | $64 \times 64 \times 64$ |
| Conv. | $1 \times 1$ | $64 \times 64 \times 64$ | $64 \times 64 \times 64$ |
| Conv. | $1 \times 1$ | $64 \times 64 \times 64$ | $64 \times 64 \times 128$ |
| Avg. Pool. | $64 \times 64$ | $64 \times 64 \times 128$ | 128 |
| FC | - | 128 | 64 |
| FC | - | 64 | 32 |
| FC | - | 32 | 1 |

AUTOMATIC WHITE BALANCE CORRECTION FOR DIGITAL IMAGES USING MULTI-HYPOTHESIS CLASSIFICATION

CROSS-REFERENCE TO RELATED APPLICATIONS

This application is a continuation of International Application No. PCT/EP2019/081178, filed on Nov. 13, 2019, the disclosure of which is hereby incorporated by reference in its entirety.

FIELD

This disclosure relates to accurately estimating scene illumination color for the purpose of performing Auto White Balancing (AWB) for digital images.

BACKGROUND

The colors of an image captured by a digital camera are affected by the prevailing light source color in the scene. Accounting for the effect of scene illuminant and producing images of canonical appearance (as if captured under an achromatic light source) is an important component of digital photography pipelines. The problem is known as color constancy, since to human observers, colors of objects often appear consistent despite being illuminated by different light sources. The computational approach for achieving this effect is known as Automatic White Balance (AWB).

The problem of AWB becomes one of estimating the color of the illumination of the scene, and adjusting the colors of the image to make it appear as if the image was taken under an achromatic (white) light source.

A trichromatic photosensor response is modelled in the standard way such that:

$$\rho_k(X) = \int_\Omega E(\lambda) S(\lambda, X) R_k(\lambda) d\lambda \, k \in \{R, G, B\} \quad (1)$$

where $\rho_k(X)$ is the intensity of color channel k at pixel location X, $\lambda$ is the wavelength of light such that: $E(\lambda)$ represents the spectrum of the illuminant, $S(\lambda,X)$ the surface reflectance at pixel location X and $R_k(\lambda)$ the is camera spectral sensitivity (CSS) for channel k, considered over the spectrum of visible wavelengths $\Omega$.

The goal of computational color constancy then becomes estimation of the global illumination color $\rho_k^E$ where:

$$\rho_k^E = \int \Omega E(\lambda) R_k(\lambda) d\lambda \, k \in \{R, G, B\} \quad (2)$$

Finding $\rho_k^E$ for each k in Equation (2) is ill-posed due to a very high number of combinations of illuminant color and surface reflectance that result in the same image value at each pixel X.

For example, if one were presented with fawn-yellow cloth pixels in an image, this could be disentangled and explained as either a white cloth object illuminated under a yellow light source or a yellow cloth object illuminated under a white light source. A very large number of such real-world combinations of light source color and object surface can result in identical pixel measurement observations.

Previous work on image illuminant color estimation can broadly be divided into statistics-based methods, which employ classical statistical summary measures of digital images and learning-based methods to estimate an unknown scene illuminant.

Contemporary learning-based regression approaches are optimized to learn image features for the particular target task considered and, in the case of illuminant estimation, this constitutes learning a mapping from input image directly to a global scene illuminant color. Convolutional neural network style models can currently be considered the state-of-the-art for scene illuminant estimation with regard to inference accuracy.

However, a typical regression style convolutional approach results in mapping an input image to only a single color in the target space of the learned model. Even in cases where the assumption of a global scene illuminant in the real-world at capture time holds reasonably well, such inferences, by definition, must collapse to a single point estimate in the illuminant color space. Therefore, if multiple scene light source colors can plausibly explain the resulting pixel observations, recorded in the image, a standard regression approach will not be able to identify or account for this.

Furthermore, in standard regression approaches, no signal or indication is provided on the confidence of the particular illuminant inference made. This is problematic, as computational methods capable of both indicating and reasoning about their own inference certainty can be considered of high utility in many domains.

For learning color constancy, capture and annotation of new data can be considered an expensive (semi-manual) and time-consuming process. Available datasets for individual cameras are therefore typically small (of the order of hundreds or thousands of images). One approach to increasing available data is to combine datasets captured by differing devices. However, attempting to naively add additional images, captured by differing sensors or cameras, likely results in catastrophic interference or catastrophic forgetting due to (often subtle) differences between camera color spaces that affect the learning target. Combination likely hurts inference performance on images captured by both the originally considered and also additional sensors or cameras.

It is desirable to develop an approach to color constancy that overcomes these problems.

SUMMARY

According to a first aspect there is provided a device for estimating a scene illumination color for a source image, the device being configured to: determine a set of candidate illuminants and for each of the candidate illuminants, determine a respective correction of the source image; for each of the candidate illuminants, apply the respective correction to the source image to form a corresponding set of corrected images; for each corrected image from the set of corrected images, implement a trained data-driven model to estimate a respective probability of achromaticity of the respective corrected image; and based on the estimated probabilities of achromaticity for the set of corrected images, obtain a final estimate of the scene illumination color for the source image.

The final estimate of the scene illumination color for the source image may be obtained using a weighting of at least two of the candidate illuminants. This may result in improved image quality.

The device may be configured to classify the achromaticity of each corrected image using a binary classification. This may be an efficient way of classifying whether the use of each particular candidate illuminant results in a well white balanced image.

The device may be further configured to determine a confidence value for the final estimate of the scene illumination color. This may contribute to both accuracy improvement and allow for the device to reliably reason about uncertainty at test time and flag challenging images.

The device may be further configured to transform the source image based on the final estimate of the scene illumination color. The transformed image may represent the scene of the source image under a canonical illuminant. This corrects for scene illumination, enabling natural image appearance in the target image.

The set of candidate illuminants may be determined by sampling at uniform intervals in an illuminant space. The set of candidate illuminants may be determined by K-Means clustering. The set of candidate illuminants may be determined using a Gaussian Mixture Model. The set of candidates determined in these ways may be representative of the space of possible light source colors, as observed by the considered sensor, in the real-world. This may allow the device to obtain a set of representative candidates for the illuminant space.

The learned data-driven model may be trained using a set of training images captured by at least two cameras. The device may therefore leverage inter-camera datasets in order to train camera agnostic models and result in improved robustness.

The trained data-driven model may be a convolutional neural network. This may be a convenient implementation.

According to a second aspect there is provided a method for estimating a scene illumination color for a source image, the method comprising the steps of: determining of a set of candidate illuminants and for each of the candidate illuminants, determining a respective correction of the source image; for each of the candidate illuminants, applying the respective correction to the source image to form a corresponding set of corrected images; for each corrected image from the set of corrected images, implementing a trained data-driven model to estimate a respective probability of achromaticity of the respective corrected image; and based on the estimated probabilities of achromaticity for the set of corrected images, obtaining a final estimate of scene illumination color for the source image.

The final estimate of the scene illumination color for the source image may be obtained using a weighting of at least two of the candidate illuminants. This may result in improved image quality.

The trained data-driven model may be trained using a set of images captured by at least two cameras. The method may therefore leverage inter-camera datasets in order to train camera agnostic models and result in improved robustness.

The trained data-driven model may be a convolutional neural network. This may be a convenient implementation.

BRIEF DESCRIPTION OF THE FIGURES

Embodiments of the present disclosure will now be described by way of example with reference to the accompanying drawings. In the drawings:

FIG. 2 shows an example of the architectural specifications of a convolutional neural network for predicting the probability of achromaticity of a candidate illuminant corrected image.

DETAILED DESCRIPTION

In exemplary embodiments of the present disclosure, the AWB task is framed as an explicit illuminant hypothesis classification task. The definition of a suitable distribution of sensor-specific candidate illuminant hypotheses allows the formulation of a set of independent classification questions: namely, does the input image, balanced by the candidate illuminant, result in an achromatic image? The probability distribution resulting from the set of inferences can then dictate how candidate illuminants are combined to form a final output illuminant (color) that can be used to perform the white balancing task on the input image.

The AWB task is essentially divided into three sub-problems: 1) the selection of a set of candidate image illuminants, 2) learning to identify candidate(s) that provide accurate illuminant correction for a given image, and 3) combining likely illuminant estimates.

Figure 1:
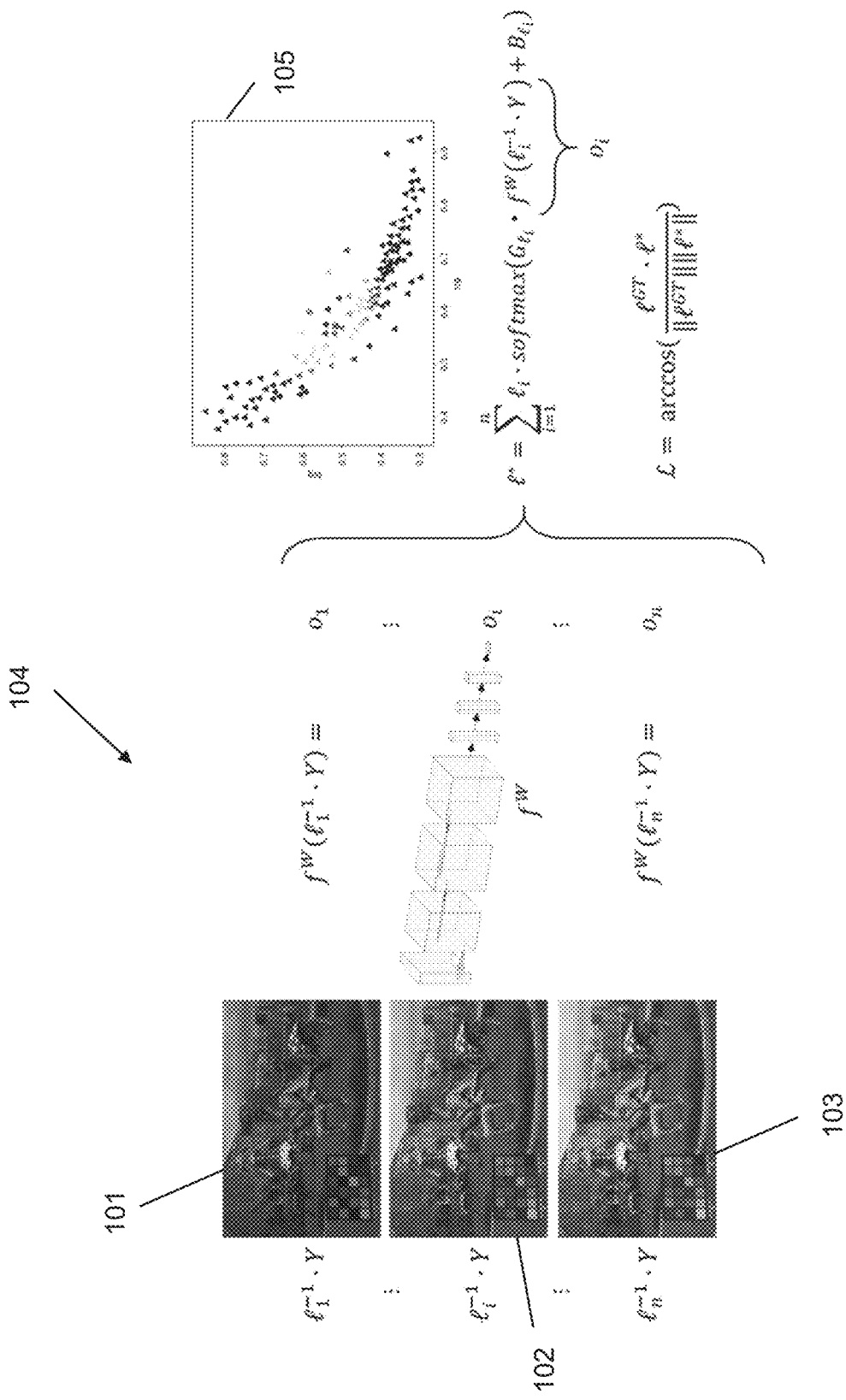
FIG. 1 conceptually illustrates an approach for automatic white balance in an exemplary embodiment.

A summary of an example of the approach is shown in FIG. 1. Firstly, a list of n candidate illuminants, where each candidate illuminant comprises light of a different color to the other candidates, is generated. Ways in which this may be done will be described in more detail below. The input image is then corrected for each of the n candidates, as shown at 101, 102, 103. As shown at 104, the likelihood of each corrected image being an achromatic image (the probability of achromaticity) is then estimated using a convolutional neural network (CNN) (i.e. to determine how plausible the correction is). The CNN receives a corrected image and estimates one likelihood for that image. Then, inferences are combined using a posterior probability distribution to generate an illuminant estimation and the error is back-propagated with the angular error loss. The plot indicated at 105 shows the candidates and the corresponding posterior probability, the prediction vector and the ground truth vector.

An exemplary embodiment of the method will now be described in more detail.

Let $y=(y_r, y_g, y_b)$ be a pixel from an input image Y in linear RGB space. Each pixel is modelled as the product of the surface reflectance $r=(r_r, r_g, r_b)$ and a global illuminant $\ell = (\ell_r, \ell_g, \ell_b)$ shared globally by all of the pixels:

$$y_k = r_k \cdot \ell_k \quad k \in \{R,G,B\} \tag{3}$$

The image is defined with m pixels: $Y=(y_1, \ldots, y_m)$ and surface reflectances $R=(r_1, \ldots, r_m)$. Given Y, the goal is to estimate illuminant e and produce $R = \text{diag}(\ell)^{-1} Y$ In order to estimate the correct illuminant of an input image Y, the color constancy problem is framed with a probabilistic generative model with unknown surface reflectances and illuminant. A set of candidate illuminants $\ell_i \in \mathbb{R}^3$, $i \in \{1, n\}$ is used, each of which are applied to the source image Y to generate a set of n tentatively corrected images $\text{diag}(\ell)^{-1} Y$. Using the set of corrected images as inputs, a convolutional neural network can then be trained to identify the most probable illuminants, such that the final estimated correction is a linear combination of the top candidates.

It is assumed that the color of the light and the surface reflectance are chosen independently, i.e. $P(\ell |X) = P(\ell) P(X)$. Using Bayes' rule, the posterior distribution of illuminants given input image Y is defined as:

$$P(\ell|Y) = \frac{P(Y|\ell)P(\ell)}{P(Y)} \tag{4}$$

The likelihood of an observed image Y for a given illuminant $\ell$ is modelled as:

$$P(Y|\ell)=\int_r P(Y|\ell,R=r)P(R=r)dr=P(R=\mathrm{diag}(\ell)^{-1}Y) \quad (5)$$

where R are the surface reflectances and $\mathrm{diag}(\ell)^{-1}Y$ is the corrected image with the illuminant $\ell$. The term $P(Y|\ell, R=r)$ is only non-zero for $R=\mathrm{diag}(\ell)^{-1}Y$. The likelihood rates whether a corrected image looks realistic.

A shallow convolutional neural network may be used which can learn to output a high likelihood if the reflectances look realistic. The prior may be learned for each illuminant independently. This can learn the individual probability for each illuminant and act as a regularization. Preferably, the prior may be modelled as a function of other variables (such as whether the image is indoor/outdoor, the time of the day, ISO, etc.).

In order to estimate the global illuminant of the image $\ell^*$, the quadratic cost (minimum squared error Bayesian estimator) can be used. This is minimized by the mean:

$$\ell^* = \int_\ell \ell \, P(\ell | Y) d\ell \quad (6)$$

The approach comprises three main steps which will be described in further detail below: candidate selection, likelihood estimation, and computation of the final illuminant.

In the first step, a set of sensor-specific illuminant candidates are first selected (light source color hypotheses). Preferably, this set of candidates is representative of the space of possible light source colors, as observed by the considered sensor, in the real-world. The goal of the candidate selection is therefore to obtain a set of representative candidates for the illuminant space. A set of n illuminants may be chosen to generate n corrected thumbnail images, which may be, for example, 64×64 pixel images. Preferably, when interpolating between the candidates, the whole illuminant space should be spanned.

In one example, uniform sampling may be used to select the candidate illuminants. The extrema of the illuminants (the maximum and minimum in each dimension) are obtained and then the illuminant space is sampled uniformly with n points. This may be implemented in the r/g, b/g color space.

In another approach, K-Means clustering (as described in Stuart P. Lloyd, "Least squares quantization in PCM", IEEE Trans. Information Theory, 28(2):129-136, 1982) on the RGB space may be used (as described in Seoung Wug Oh and Seon Joo Kim, "Approaching the computational color constancy as a classification problem through deep learning", Pattern Recognition, 61:405-416, 2017).

Alternatively, a Gaussian Mixture Model (GMM) may be used to fit four two-dimensional Gaussian distributions on the r/g, b/g color space, and then sample n points from the CNN.

A correction for the source image according to each candidate illuminant is then determined and applied to the source image for each candidate illuminant.

In the step of likelihood estimation, in a preferred embodiment, the method learns to identify well white balanced images by estimating the probability of achromaticity of the corrected image (i.e. how likely it is that a corrected image is under achromatic light). Other non-learning-based methods for estimating the probability of achromaticity may also be used.

In the preferred embodiment of using a data-driven model to learn the probability of achromaticity for each candidate corrected image, a convolution neural network can take a corrected image as input, and output a probability that the image was well white balanced.

During model training, final scene illuminants are estimated for each training image as follows. Firstly, the binary classification result-set of the illuminant candidate population provides a probability distribution for each illuminant candidate. In order to find the illuminant that provides maximum probability of an achromatic result, a softmax activation (a differentiable maximum) may be used. The final illuminant estimate for each image can then computed using soft-assign; a weighted linear combination of the candidate illuminants, where weightings are representative of independent classification certainties. By comparing the final estimated illuminant with the physically measured ground-truth light source color (per image sample), the resulting difference (error) may be iteratively back-propagated and the model parameters updated to improve model performance (as in standard supervised-learning).

In the preferred implementation, only one CNN is used to estimate the likelihood for all of the candidate illuminants. The source image is corrected according to all illuminant candidates independently and then the correctness of each solution evaluated independently with the network.

It is desirable to choose the illuminant that provides maximum probability, so that soft-argmax activation (a differentiable maximum) may be used.

At inference time, a set of binary classification questions are employed: does an image, balanced by each specific illuminant candidate, result in achromatic appearance? That is, does use of each particular illuminant candidate result in a well white balanced image? The network may output an estimated probability score of between 0 and 1, where 0 indicates that the illuminant does not result in an achromatic image and 1 indicates a high likelihood that the illuminant results in an achromatic image. The network may output an unconstrained number for each corrected image that is then normalized. A large output means a high likelihood, and a small (or negative) output means a low likelihood. Normalization of the set of values results in each value being in the range [0, 1] (i.e. a well-defined probability distribution).

As illustrated in FIG. 2, for use as the data-driven model for determining the probability of achromaticity for each candidate illuminant, a CNN with only one spatial convolution is preferred. In the example shown in FIG. 2, all fully connected layers and convolutions are followed by a Rectified Linear Unit (ReLU) activation except the last Fully Connected (FC) layer. In this example, dropout of 50% is applied after global average pooling.

Preferably, the first layer (adapted from Karen Simonyan and Andrew Zisserman, "Very deep convolutional networks for large-scale image recognition", 3rd International Conference on Learning Representations, ICLR 2015, San Diego, CA, USA, May 7-9, 2015, Conference Track Proceedings, 2015) is pre-trained on ImageNet (as described in J. Deng, W. Dong, R. Socher, L.-J. Li, K. Li, and L. Fei-Fei, "ImageNet: A Large-Scale Hierarchical Image Database", CVPR09, 2009). The next layers are 1×1 convolutions followed by a spatial average down to 1 pixel. Finally, three fully connected layers output a single value that represents the probability that the image is well white balanced (c.f. Equation (5)).

$$\log P(Y|\ell) = f^W(\mathrm{diag}(\ell)^{-1}Y) \quad (7)$$

where f is a trained CNN parametrized by model weights W, Y is the input image, e is the candidate illuminant, and $\mathrm{diag}(\ell)^{-1}Y$ is the corrected image.

After obtaining a log-likelihood (c.f. Equation (7)) per candidate, this gives an independent estimation of the likelihood (i.e. probability) of each candidate. However, since some candidates may be more likely than others, an affine transformation is introduced to learn a prior distribution. The log-posterior probability is given by:

$$\log P(\ell \mid Y) = G \cdot \log P(Y \mid \ell) + B \qquad (8)$$

The bias B learns the more likely illuminants (prior distribution in a Bayesian sense) while the gain G learns to amplify some illuminants.

A differentiable function is preferable to be able to train the model end-to-end. Therefore, in order to estimate the final illuminant $\ell^*$, the quadratic cost (minimum squared Bayesian estimator) is preferably used. This is minimized by the posterior mean of $\ell^*$ (c.f. Equation (6)). This function, as defined below, is differentiable and allows end-to-end training of the network:

$$\ell^* = \frac{1}{\sum e^{\log P(\ell_i \mid Y)}} \sum_{i=1}^{N} \ell_i \cdot e^{\log(P(\ell_i \mid Y))} \qquad (9)$$

This is also known as soft-argmax: the linear combination of all the candidates with their probabilities.

Preferably, the distribution of probabilities is predominantly uni-modal. Preferably, batch normalization is explicitly omitted for the final layer. In this case, the network may be able to learn the soft-max temperature to produce uni-modal output.

The network is trained end-to-end with the angular error loss function, where l* and l are the prediction and ground truth illuminant, respectively:

$$\mathcal{L}_{error} = \arccos\left(\frac{l \cdot l^*}{|l||l^*|}\right) \qquad (10)$$

Figure 3:
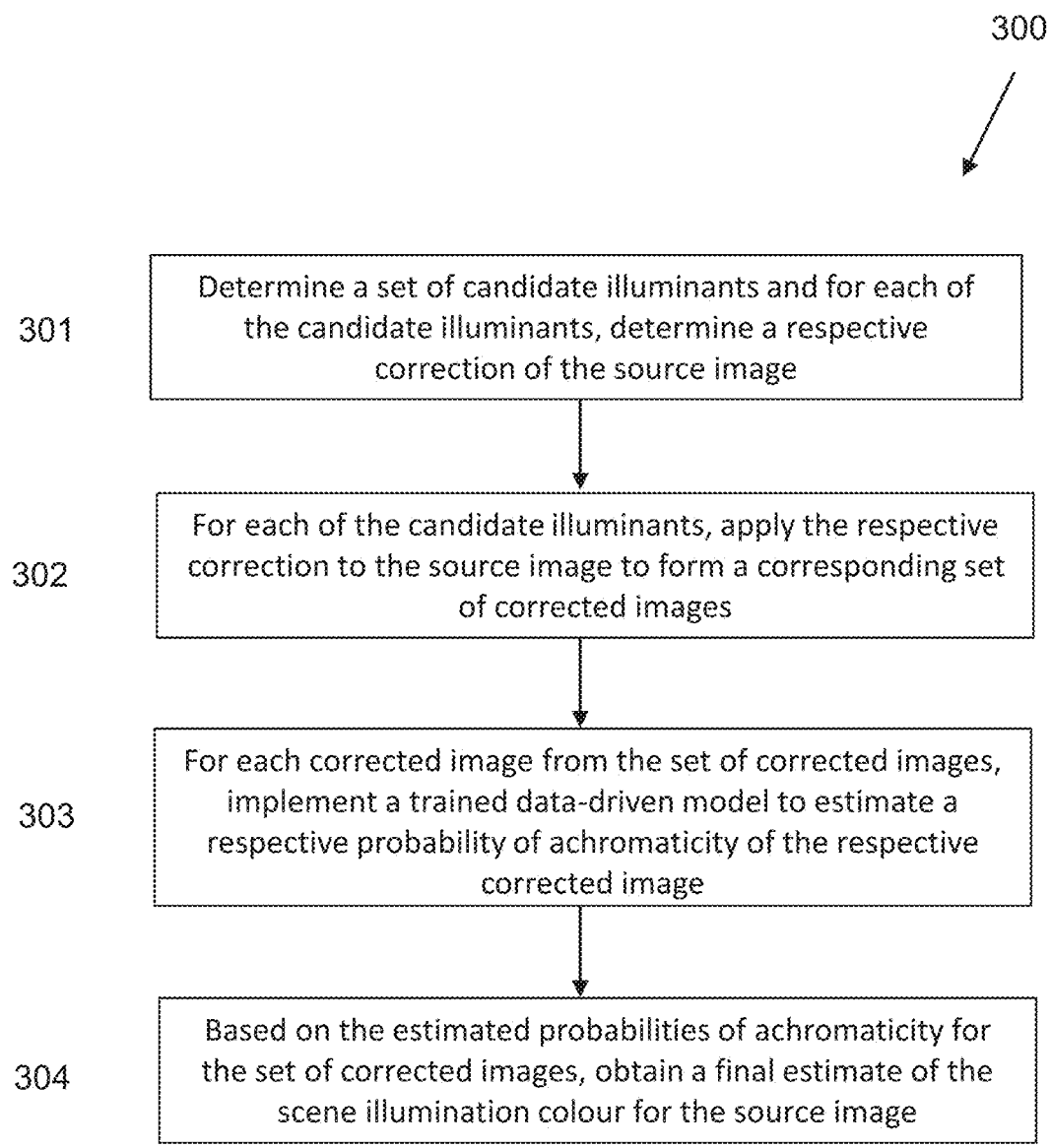
FIG. 3 shows an example of a method for estimating a scene illumination color for a source image.

FIG. 3 summarizes an example of a method for estimating a scene illumination color for a source image. At step 301, the method comprises determining of a set of candidate illuminants and, for each of the candidate illuminants, determining a respective correction of the source image. At step 302, for each of the candidate illuminants, the method comprises applying the respective correction to the source image to form a corresponding set of corrected images. At step 303, for each corrected image from the set of corrected images, a trained data-driven model is implemented to estimate a respective probability of achromaticity of the respective corrected image. At step 304, based on the estimated probabilities of achromaticity for the set of corrected images, a final estimate of scene illumination color for the source image is obtained.

Once the final estimate of the scene illumination color has been determined, a corresponding correction for the estimate final illuminant can then be applied to the source image to transform it to a target image. The target image represents the scene of the source image under a canonical illuminant.

Optionally, the method may also output a confidence value for the estimated final scene illumination color. Producing an estimation of the uncertainty of the model is a desirable feature for any color constancy method.

Confidence estimation may be performed by adapting the approach outlined in Terrance DeVries and Graham W. Taylor, "Learning confidence for out-of-distribution detection in neural networks", CoRR, abs/1802.04865, 2018, to the method. The CNN outputs a probability for confidences for each illuminant. The confidences for each illuminant are concatenated and three fully connected layers are added to estimate the final confidence of the illuminant estimate for the source image. Then, the prediction is adjusted by interpolating between the ground truth illuminant and the initial prediction:

$$l^*_{final} = c \cdot l^* + (1-c) \cdot l \qquad (11)$$

The network may use "hints" during training and if it is not certain, it outputs a confidence value close to zero to reduce the angular error loss function (c.f. Equation (10)). A regularization may be added to avoid the degenerate case of estimating c=0 for all inputs:

$$\mathcal{L}_{confidence} = -\log(c) \qquad (12)$$

A new hyper-parameter is introduced by this loss, $\lambda_c$, that balances the angular error loss (c.f. Equation (10)) and the confidence loss (c.f. Equation (12)):

$$\mathcal{L} = \mathcal{L}_{error} + \lambda_c \mathcal{L}_{confidence} \qquad (13)$$

The ability to train with multiple cameras is a desirable property of a color constancy model. However, most models fail to train with multiple cameras and are intrinsically device-dependent. A device-independent model is of interest because of the small public training sets and the cost of collecting new data for each new device on the market. The CNN used in exemplary embodiments of the method described herein learns to produce a probability for an input image to be well white balanced. Framing the color constancy task like this has been shown experimentally in some implementations to be device-independent.

To train the model using images captured by different cameras, a different set of candidates (and a different candidate selection) may be used for each of the cameras, but only one CNN is trained.

A method of training such a data-driven model for estimating a scene illumination color for a source image, which may be generated by a suitable processing entity, may comprise the following steps: (i) acquiring a set of images and for each image of the set of images, acquiring a respective indication of an illuminant; and (ii) training parameters of the model by repeatedly: selecting at least one image of the set of images, forming by means of a current set of parameters of the model an estimate of an illuminant of the at least one image, and updating the parameters of the model based on a comparison between the estimated illuminant and the indicated illuminant for the respective at least one image.

Mini-batch stochastic gradient descent may be used to train the model. The weights of the model may be updated with a batch of images that may be selected randomly. The model weights may be updated by repeatedly considering batches (subsets) of training images. The model may be trained with a different camera for each batch of images (i.e. all images within a batch update may pertain to a particular source camera). During testing time, the candidates may again be different for each camera (for the same candidates as during training).

A device comprising a processor may be configured to determine the final estimate of the scene illumination color for a source image collected by the device by means of a model generated by exemplary embodiments of the method described above.

Figure 4:
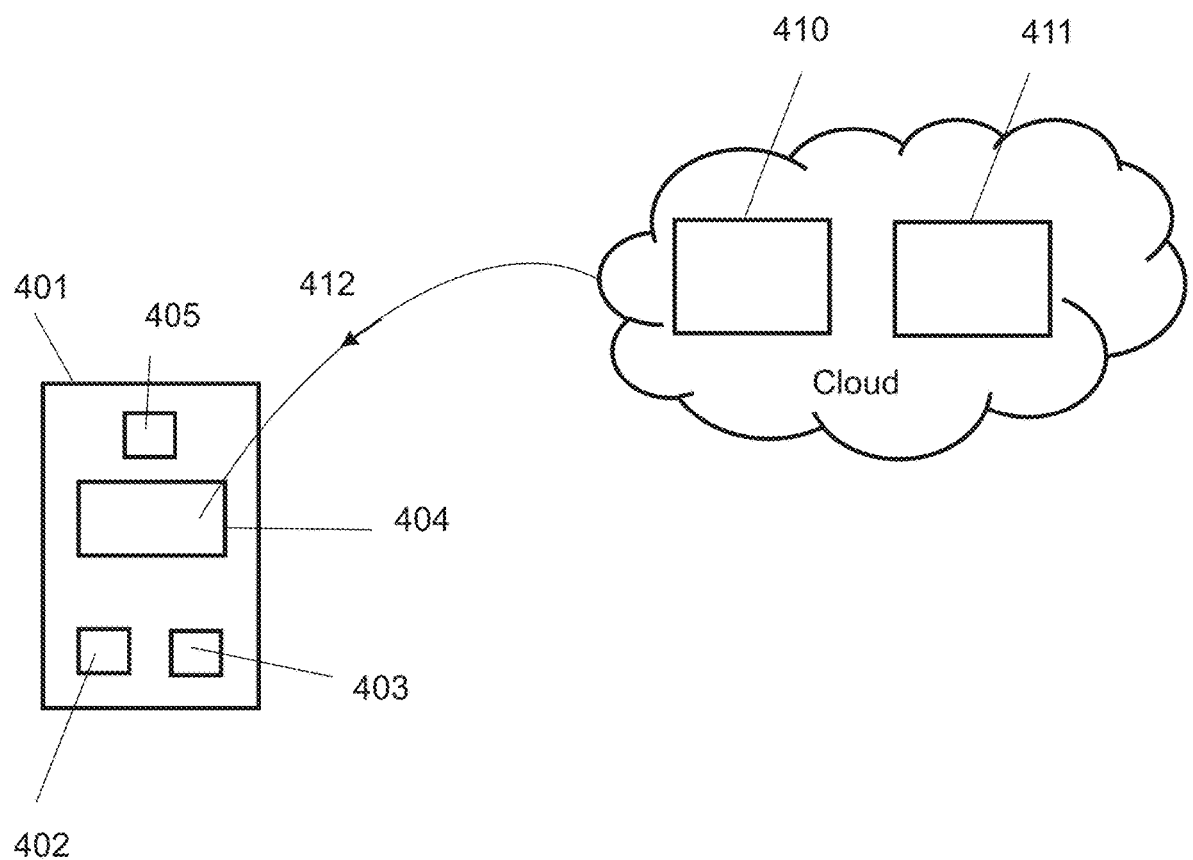
FIG. 4 schematically illustrates an example of a camera configured to implement an exemplary embodiment of a method for estimating a scene illumination color for a source image.

FIG. 4 shows an example of an architecture including a camera that uses an exemplary embodiment of the method described herein to perform AWB. A camera 401 is connected to a communications network. Camera 401 comprises an image sensor 402. The camera also comprises a memory 403, a processor 404 and a transceiver 405. The memory stores in non-transient form code that can be run by the processor 404. In some implementations, that code may include a data-driven model as described above. The model may include code that is directly executable by the processor and/or parameters such as neural network weightings which are not directly executable instructions but serve to configure other executable code that is stored in the memory 403. The transceiver 405 may be capable of transmitting and receiving data over either or both of wired and wireless communication channels. For example, it may support Ethernet, IEEE 802.11B and/or a cellular protocol such as 4G or 5G.

Such a camera 401 typically includes some onboard processing capability. This could be provided by the processor 404. The processor 404 could also be used for other functions of the device.

The transceiver 405 is capable of communicating over a network with other entities 410, 411. Those entities may be physically remote from the camera 401. The network may be a publicly accessible network such as the internet. The entities 410, 411 may be based in the cloud. Entity 410 is a computing entity. Entity 411 is a command and control entity. These entities are logical entities. In practice they may each be provided by one or more physical devices such as servers and data stores, and the functions of two or more of the entities may be provided by a single physical device. Each physical device implementing an entity comprises a processor and a memory. The devices may also comprise a transceiver for transmitting and receiving data to and from the transceiver 405 of camera 401. The memory stores in a non-transient way code that is executable by the processor to implement the respective entity in the manner described herein.

The command and control entity 411 may train the model used for estimating the illumination color of the source image. This is typically a computationally intensive task, even though the resulting model may be efficiently described, so it may be efficient for the development of the model to be performed in the cloud, where it can be anticipated that significant energy and computing resource is available. It can be anticipated that this is more efficient than forming such a model at a typical camera.

In one implementation, once the model has been developed in the cloud, the command and control entity can automatically form a corresponding model and cause it to be transmitted to the relevant camera device. In this example, AWB is performed at the camera 401 by processor 404.

In another possible implementation, an image may be captured by the camera sensor 402 and the image data may be sent by the transceiver 405 to the cloud for processing, including AWB in the Image Signal Processor Pipeline. The resulting target image could then be sent back to the camera 401, as shown at 412 in FIG. 4.

Therefore, exemplary embodiments of the method may be deployed in multiple ways; for example in the cloud, on the device, or alternatively in dedicated hardware. As indicated above, the cloud facility could perform training to develop new models or refine existing ones. Depending on the compute capability near to the data corpus, the training could either be undertaken close to the source data, or could be undertaken in the cloud, e.g. using an inference engine. The AWB correction may also be performed at the camera, in a dedicated piece of hardware, or in the cloud.

As described above, in the AWB approach described herein, the problem is framed as an illuminant hypothesis classification task (as opposed to a regression task), to determine, for each candidate illuminant, whether the image is a well white balanced image or not. The model explicitly selects the possible candidates (hypothesis illuminants), and explicitly learns to decide a final estimate from the generated probability distribution. It is additionally learned to estimate the confidence of the final prediction.

The approach decomposes the AWB problem into three sub-problems: (1) the definition of a set of suitable candidate illuminants and their correction of the source image, (2) for each candidate illuminant corrected image, binary classification of its achromaticity, and (3) aggregation of the results through probabilistic weighting to achieve the final estimate of the illuminant.

Additionally, a confidence value associated with each inference can be learnt, contributing to both accuracy improvement and an ability to reliably reason about uncertainty at test time and flag challenging images.

Exemplary embodiments of the method described herein experimentally was tested on a batch size of 32 with an initial learning rate of $5 \times 10^{-3}$ divided by two after 10, 50 and 80 epochs. Inference was found to be efficient by concatenating each candidate corrected image into the batch dimension. $\lambda_c$ was found to be a suitable hyper-parameter to balance between the confidence loss (Equation (12)) and the angular error loss (Equation (10)). Three datasets were used in the experiments: NUS (Dongliang Cheng, Dilip K Prasad, and Michael S Brown, "Illuminant estimation for color constancy: why spatial-domain methods work and the role of the color distribution", JOSA A, 31(5):1049-1058, 2014), Cube (Simone Bianco, Gianluigi Ciocca, Claudio Cusano, and Raimondo Schettini, "Automatic color constancy algorithm selection and combination", Pattern recognition, 43(3):695-705, 2010) and Gehler-Shi (Lilong Shi and Brian Funt, Re-processed version of the gehler color constancy dataset of 568 images, http://www.cs.sfu.ca/~color/data/ 2000). In these experiments, superior results were obtained for the NUS and Cube datasets, and competitive results were provided for the Gehler-Shi dataset.

Therefore, through experimentation, illuminant estimation accuracy using exemplary embodiments of the method described herein has been found in some implementations to be competitive with the state-of-the-art on three public datasets, and the technique has the ability to leverage inter-camera datasets in order to train camera agnostic models and additionally improved robustness.

The described alteration to the posed model learning question, namely; 'is the resulting image achromatic?' (c.f 'which point in the camera color space is correct?') allows to alternatively and naturally constrain how new information pertaining to difference sensors is incorporated.

The device-independent training strategy allows for the leveraging multi-camera datasets and may outperform models trained using only single camera data. The approach is able to train with multiple cameras, but only the candidate illuminants for the desired camera are required.

The method is able to be trained effectively with multi-camera datasets (i.e. across multiple image sensors) by selecting different illuminant candidates for each camera and training a single CNN. In this fashion, the hypotheses being asked are camera-specific, yet the learned model weights are camera-agnostic, allowing for the natural benefit from the well-understood improvements that can be gained from adding additional data to CNN model training. The approach is therefore able to utilize model training data provided by multiple camera sensors. Learning a function that performs inference by directly mapping images to points in the camera color space (residing in a particular sensor RGB space), for example by regression, can prove accurate for images captured by that sensor yet by definition performance will be fundamentally linked to the particular camera due to the relationship between images and corresponding ground-truth illuminant pairs seen during training time.

Also related to model learning is the availability of data; increasing the amount of training data is desirable due to well-understood effects of data magnitude in relation to (contemporary) learning performance.

As described above, in addition to considering inference distributions, it is directly learned to output an explicit confidence rating related to each result. By considering a range of illuminant hypotheses, the set of binary classification problems result in an explicit distribution over candidate illuminants, representing the likelihood that each candidate provides an accurate, well-white-balanced (achromatic) image. Standard statistical tools can then be applied to the inference distribution to reason about the certainty of the result. Questions can be asked such as did inference on the input image result in a single or multi-modal distribution? (i.e. was there a single likely solution or multiple plausible illuminant candidate solutions). Other first order characteristics of the distribution may also be considered, such as dispersion, variability, scatter, spread, 'peakiness' and 'long-tailedness'. The approach therefore provides for reasoning about result (un)certainty, interpretability and explainability.

In summary, the general approach comprises three steps: (1) choosing a set of n illuminant candidates to generate n corrected images; (2) evaluating these n images independently (preferably with a CNN) to estimate the probability that the input image is a well white balanced; and (3) combining the probability of each candidate illuminant to give a final illuminant estimation.

By employing this strategy, the issue of white balance correctness is framed as a classification problem. By using camera-specific illuminant candidates during training, yet employing a single set of network parameters to learn the classification task, the approach affords robust generalization to capture the device at inference time. The approach may take thumbnail images (e.g. 64×64) as input and works with a shallow network that allows for real-time implementation as part of ISP on a mobile device.

Exemplary embodiments of the present disclosure include in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Exemplary embodiments of the present disclosure may consist of any such individual feature or combination of features. In view of the foregoing description it will be evident to a person skilled in the art that various modifications may be made within the scope of the disclosure.

What is claimed is:

1. A device for estimating a scene illumination color for a source image, the device comprising a processor and a non-transitory memory having processor-executable instructions stored thereon, wherein the processor is configured to execute the processor-executable instructions to cause the device to perform the following operations:
   determining a set of candidate illuminants;
   for each candidate illuminant of the set of candidate illuminants, determining a respective correction for the source image;
   for each candidate illuminant of the set of candidate illuminants, applying the respective correction to the source image to form a corresponding set of corrected images;
   for each corrected image from a respective set of corrected images, estimating a respective probability of achromaticity of the respective corrected image using a trained data-driven model;
   based on estimated probabilities of achromaticity for each set of corrected images, obtaining a final estimate of the scene illumination color for the source image; and
   performing a correction on the source image using the obtained final estimate to transform the source image to a target image.

2. The device according to claim 1, wherein the final estimate of the scene illumination color for the source image is obtained using a weighting of at least two candidate illuminants of the set of candidate illuminants.

3. The device according to claim 1, wherein the processor is further configured to execute the processor-executable instructions to cause the device to perform the following:
   classifying the achromaticity of each corrected image using a binary classification.

4. The device according to claim 1, wherein the processor is further configured to execute the processor-executable instructions to cause the device to perform the following:
   determining a confidence value for the final estimate of the scene illumination color.

5. The device according to claim 1, wherein the target image represents the scene of the source image under a canonical illuminant.

6. The device according to claim 1, wherein the set of candidate illuminants is determined by sampling at uniform intervals in an illuminant space.

7. The device according to claim 1, wherein the set of candidate illuminants is determined by K-Means clustering.

8. The device according to claim 1, wherein the set of candidate illuminants is determined using a Gaussian mixture model.

9. The device according to claim 1, wherein the trained data-driven model is trained using a set of training images captured by at least two cameras.

10. The device according to claim 1, wherein the trained data-driven model is a convolutional neural network.

11. A method for estimating a scene illumination color for a source image, the method comprising:
    determining, by a device, a set of candidate illuminants;
    for each candidate illuminant of the set of candidate illuminants, determining, by the device, a respective correction of the source image;
    for each candidate illuminant of the set of candidate illuminants, applying, by the device, the respective correction to the source image to form a corresponding set of corrected images;
    for each corrected image from a respective set of corrected images, estimating, by the device, a respective probability of achromaticity of the respective corrected image using a trained data-driven model;
    based on estimated probabilities of achromaticity for each set of corrected images, obtaining, by the device, a final estimate of scene illumination color for the source image; and
    performing, by the device, a correction on the source image using the obtained final estimate to transform the source image to a target image.

12. The method according to claim 11, wherein the target image represents the scene of the source image under a canonical illuminant.

13. The method according to claim 11, wherein the final estimate of the scene illumination color for the source image is obtained using a weighting of at least two candidate illuminants of the set of candidate illuminants.

14. The method according to claim 11, wherein the trained data-driven model is trained using a set of images captured by at least two cameras.

15. The method according to claim 11, wherein the trained data-driven model is a convolutional neural network.

16. A non-transitory processor-readable medium having processor-executable instructions stored thereon for estimating a scene illumination color for a source image, wherein the processor-executable instructions, when executed, facilitate:
- determining, by a device, a set of candidate illuminants;
- for each candidate illuminant of the set of candidate illuminants, determining, by the device, a respective correction of the source image;
- for each candidate illuminant of the set of candidate illuminants, applying, by the device, the respective correction to the source image to form a corresponding set of corrected images;
- for each corrected image from a respective set of corrected images, estimating, by the device, a respective probability of achromaticity of the respective corrected image using a trained data-driven model;
- based on estimated probabilities of achromaticity for each set of corrected images, obtaining, by the device, a final estimate of scene illumination color for the source image; and
- performing, by the device, a correction on the source image using the obtained final estimate to transform the source image to a target image.

17. The non-transitory processor-readable medium according to claim 16, wherein the final estimate of the scene illumination color for the source image is obtained using a weighting of at least two candidate illuminants of the set of candidate illuminants.

18. The non-transitory processor-readable medium according to claim 16, wherein the trained data-driven model is trained using a set of images captured by at least two cameras.

19. The non-transitory processor-readable medium according to claim 16, wherein the trained data-driven model is a convolutional neural network.

20. The non-transitory processor-readable medium according to claim 16, wherein the target image represents the scene of the source image under a canonical illuminant.

* * * * *